Nov. 2, 1948. S. R. SMITH, JR 2,452,961
PROTECTIVE SWITCH
Filed Nov. 27, 1945
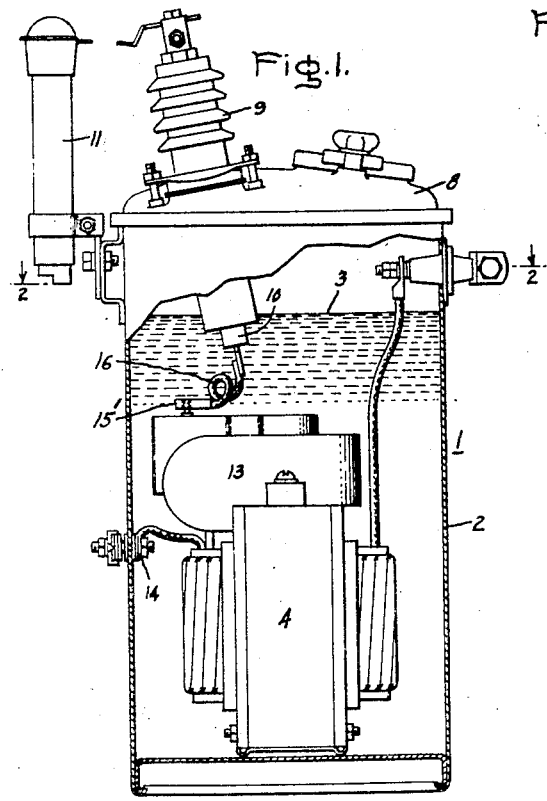
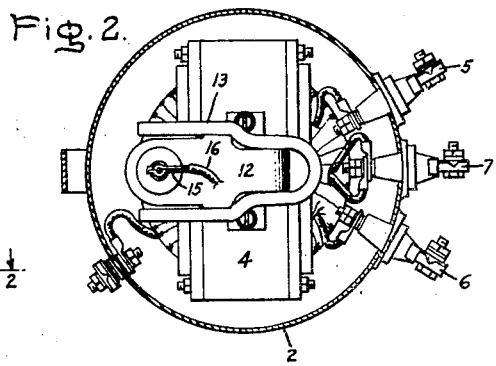
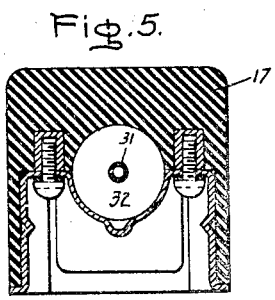
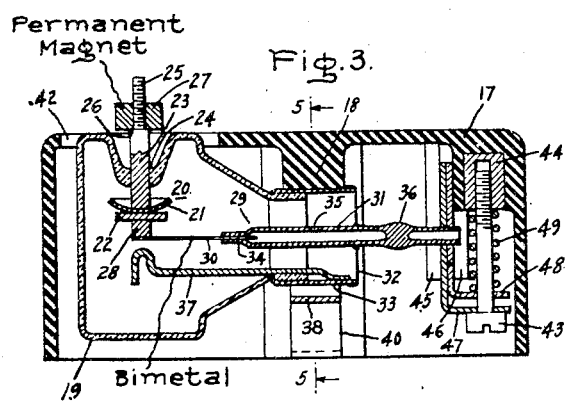
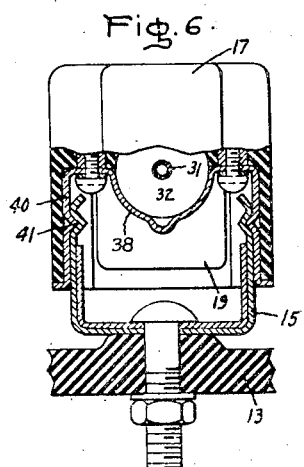
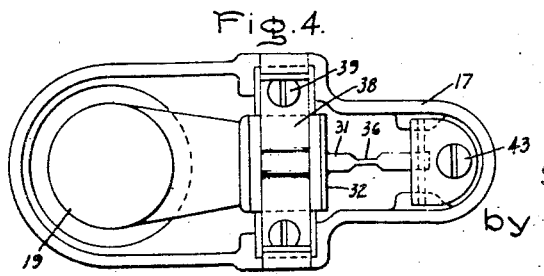
Inventor:
Sidney R. Smith, Jr,
by Ernest C. Britton
His Attorney.

Patented Nov. 2, 1948

2,452,961

UNITED STATES PATENT OFFICE 2,452,961

PROTECTIVE SWITCH

Sidney R. Smith, Jr., Pittsfield, Mass., assignor to General Electric Company, a corporation of New York Application November 27, 1945, Serial No. 631,165

2 Claims. (Cl. 200—113)

My invention relates to protective devices for electrical apparatus, and more particularly to devices for interrupting the current flowing through the electrical apparatus upon the occurrence of predetermined conditions of the associated circuit or of the apparatus. Specifically, my invention is an improvement on the arrangement disclosed and claimed in my prior copending application, Serial No. 609,188, filed August 6, 1945, and assigned to the same assignee as the present application.

Electrical apparatus, and particularly apparatus employing a liquid insulating dielectric, such as transformers, are subject to various types of disturbances. One type of disturbance which might occur is a fault condition on the associated circuit causing very high currents to flow through the windings of the transformer. If protective means were not provided to interrupt the current flowing, these fault or short circuit currents might destroy the transformer. Another type of disturbance which might occur is an overload condition which continues for a long period of time so that the temperature of the liquid dielectric, which may be oil or the like, increases above a safe value. It is not only desirable but necessary that the electrical apparatus, when subjected to long time overloads, be disconnected when its temperature reaches a predetermined value.

In recent years, and prior to the invention covered by my above mentioned copending application, a large number of protective devices have been suggested for electric apparatus such as transformers but all of these devices have had certain shortcomings. For example, if the device were mounted in the transformer immersed in the liquid insulating dielectric, the arcing during the circuit interrupting operation would cause contamination of the dielectric. Heretofore such devices were one-shot devices and were placed in the secondary circuit. As a result of this they had to be of fairly large size so as to be capable of interrupting large currents. However, since they had to perform only one interrupting operation as contrasted with repeated openings and closings it was a simple matter to design such a device. Also the secondary windings of transformers of the distribution type to which my invention is particularly applicable are generally made in two parts with four leads brought out to terminals on the transformer casing, two leads of which are usually connected to the center terminal which is generally grounded. A protective device for the secondary winding, therefore, would require at least two sets of contacts.

It would be desirable to provide a protective device for electric apparatus, such as distribution transformers, which would be connected in the primary winding so that only a single device with a single set of contacts is required. For a 5 kva.-7200 volt 120/240 volt transformer, for example, such a device would only have to interrupt 1/30 or 1/60 as much current as a similar device connected in the secondary winding, and consequently could be of such a small size as not to interfere with the transformer size or construction. Such small size would obviously reduce the cost and being associated with the primary winding, standard secondary leads could be employed with no complications being introduced when transformers are paralleled or the secondary windings are connected in series. It would furthermore be desirable to provide a protective device which is capable of repeatedly opening and reclosing the circuit which could be immersed in the liquid dielectric so as to be responsive both to fault currents and long time overloads, and in which no contamination of the oil or liquid dielectric by virtue of arcing could occur and consequently no explosive gases would be created. It would furthermore be particularly desirable to provide an automatic reclosing protective device for transformers which would operate repeatedly to open the circuit and restore service thereby eliminating many trips by power company personnel to restore service, which automatic device is simple and compact and no more expensive than one-shot devices in use today.

Accordingly it is an object of my invention to provide a new and improved protective device.

It is another object of my invention to provide a new and improved automatic reclosing circuit interrupting device for use in transformers which is designed for repeated operation and especially applicable for rural lines so that patroling of the lines by power company personnel is substantially reduced.

It is a further object of my invention to provide a new and improved circuit interrupting device provided with thermal means for controlling the same which device may be mounted in the liquid dielectric of electric apparatus, such as transformers, and which is constructed so that operation thereof causes no contamination of the liquid dielectric or the production of explosive gases and oxidation of the contacts is completely eliminated.

Still another object of my invention is to provide a protective device comprising thermal means for controlling interrupting contacts in which both the thermal means and the interrupting contacts are mounted within an evacuated envelope.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is an elevational view, partly in section, of an electrical apparatus, specifically a transformer, embodying my invention; Fig. 2 is a sectional view taken on line 2—2 of Fig. 1; Fig. 3 is an enlarged sectional view of the protective device employed in Figs. 1 and 2; Fig. 4 is a bottom view of Fig. 3 assuming that Fig. 3 shows a complete device; Fig. 5 is a sectional view taken on line 5—5 of Fig. 3, assuming that Fig. 3 shows a complete device, and Fig. 6 is an end view of Fig. 3, partly in section, with a portion of the transformer of Fig. 1 included in order to illustrate the mounting arrangement of the protective device and its electrical connection with the transformer.

Although the new and improved circuit interrupting device, or protective device, of my invention may have many applications it is specifically applicable to the protection of electric apparatus such as transformers, and accordingly it will be described hereinafter in this specific connection although it should be understood that my invention is not limited to this specific application.

Referring now to Fig. 1, there is illustrated an electric apparatus specifically shown as a transformer 1 comprising a casing 2 which is filled to the level 3 with an insulating liquid dielectric such as a halogenated hydrocarbon of the type disclosed and claimed in Clark Patents 1,850,702, 1,931,373, and 1,931,455, assigned to the same assignee as the present application, or another liquid insulating dielectric, such as oil. Immersed within the liquid insulating dielectric are the transformer core and windings generally designated by the numeral 4.

The low voltage or secondary windings of transformer 1 are effectively provided with a mid-tap so that three terminals, specifically designated as 5, 6 and 7, are provided (see Fig. 2), 7 forming the mid-tap of the secondary winding and usually being grounded. The transformer casing 2 is provided with a cover 8 which supports a high voltage bushing 9. Preferably, mounted within high voltage bushing 9 is a suitable protective device such as a bushing fuse 10, only a portion of which is shown. Bushing fuse 10 provides protection to the distribution line and insures continuity of service as far as the distribution line is concerned, by disconnecting the transformer in the event of an internal fault. High voltage fuse 10 is preferably of the type disclosed in my prior joint Patent 2,337,353, assigned to the same assignee as the present application.

In order to protect the transformer against high voltage surges, such as lightning, a suitable lightning arrester 11 is illustrated as being supported from the transformer casing. The lightning arrester may comprise any suitable construction but is specifically illustrated as of the type disclosed and claimed in a copending application of John W. Kalb, Serial No. 578,894, filed February 20, 1945, and assigned to the same assignee as the present application.

In most protected transformers on the market today a low voltage circuit breaker is provided in series with the secondary winding of the transformer. For a conventional 5-kva. rural distribution transformer the current which flows in the secondary winding for secondary line-to-line faults is 30 times the current flowing in the primary winding and for a line-to-neutral fault 60 times the current flowing in the primary winding. It is quite obvious then that a circuit breaker placed in the secondary winding requires large conducting parts and since three leads are brought out, as is indicated by the terminals 5, 6 and 7, at least two sets of interrupting contacts will be required. In accordance with my invention I have provided a circuit interrupting device generally indicated at 12 which is connected in series with the primary winding of the transformer and since only a single high voltage bushing 9 is required, only a single set of interrupting contacts is required. Distribution transformers are usually provided with a high voltage terminal board which is indicated at 13 and which is supported on the core and winding structure 4. One terminal of the high voltage winding specifically designated at 14 is grounded to the tank or casing 2, while the other terminal terminates in a spring clip 15, best shown in Fig. 6, so that quick detachable connection with the circuit interrupting device of my invention can be made. The circuit interrupting device 12 is also connected by a suitable conductor 16 with the bushing fuse 10 whereby the interrupting device 12 of my invention is connected in series with the high voltage winding so that the current magnitude it is required to interrupt is only a small percentage of the current which flows in the secondary windings of the transformer. Of course the voltage which the device must interrupt is much higher than would be the case if connected in the secondary windings but the vacuum type protective device of my invention, to be described hereinafter, is inherently suited for interrupting high voltages in a small space, so long as the current is of a low order of magnitude.

The circuit interrupting device 12 of my invention, best shown in Figs. 3 to 6, comprises a high voltage circuit breaker of very small dimensions so that it may be directly mounted on the transformer terminal board 13. As illustrated, this high voltage circuit breaker 12 comprises an insulating support 17 in the form of a casing which is open at the bottom. This casing has a downwardly extending central portion 18 for supporting an evacuated envelope 19 formed of glass or other suitable insulating material. This evacuated envelope is preferably the housing of a vacuum switch of the type disclosed and claimed in United States Letters Patent No. 2,383,973, Jones, granted September 4, 1945, and assigned to the same assignee as the present application.

The vacuum switch generally designated by the reference numeral 20 and comprising the evacuated envelope 19, includes a pair of relatively movable contacts 21 and 22, the contact 21 being a stationary contact suitably supported in envelope 19 on a conducting rod 23, fastened in envelope 19 by a glass-to-metal seal 24. Conducting rod 23 is provided with a terminal portion 25 of reduced cross section which may be engaged by clip 15'. A shoulder 26 on conducting rod 23 is defined by virtue of the portion of reduced cross section 25. For a purpose which will become apparent as the following description proceeds, a permanent magnet 27 is slipped over the terminal portion 25 of conducting rod 23 and rests on shoulder 26. The stationary contact 21 is in the form of a convex disk of fairly large diameter with the convex surface thereof having a fairly large radius, the purpose of which will also become apparent as the following description proceeds.

Movable contact 22, in the form of a flat disk, is mounted on an extension 28 which in turn is mounted on a switch arm generally indicated at 29 which comprises a bimetallic element 30 and a tubular member 31. Tubular member 31 is preferably composed of copper plated steel tubing and extends through and is copper brazed and sealed to a flexible diaphragm 32 which is fastened to a metallic ferrule 33 in sealed relationship with the evacuated envelope 19. The end of tubular member 31 within envelope 19 suitably supports the bimetal or bimetallic element 30 as indicated at 34. The other end of bimetal 30 supports extension 28. Tubular member 31 is provided with an opening 35 within envelope 19 so that envelope or housing 19 may be evacuated through tubular member 31 which may be flattened as indicated at 36 and sealed exteriorly of casing or envelope 19.

In order to limit the opening movement of movable contact 22, a suitable stop 37 is provided in casing 19. Preferably stop 37 is formed of a small rod with one end thereof welded to the inside surface of metal ferrule 33 and the other end positioned so as to limit the opening movement of movable contact 22. If desired, stop 37 may also support suitable getter material (not shown).

The vacuum switch of my invention described thus far is adapted to be inserted through the opening in the bottom of the casing or insulating support 17 and is held in position by means of a supporting strap 38 partially surrounding metal ferrule 3 and fastened by suitable fastening means, such as screws 39, to the downwardly extending central portion 18 of casing 17. Supporting strap 38, which is formed of conducting material and is in electrical engagement with the metal ferrule 33 and consequently with movable contact 22, is provided with downwardly extending leg portions 40 which are adapted to electrically engage contact clip 15 (see Fig. 6). Actually contact clip 15 also mechanically supports circuit interrupting device 12 in position on terminal board 13 and to this end it may be desirable to provide interlocking portions generally indicated at 41 on downwardly extending leg portions 40 and the legs of U-shaped contact clip 15. Casing 17 is furthermore provided with an opening 42 through which the conducting rod 23 may extend.

The arrangement described thus far differs from the arrangement described in my prior copending application in one important respect in that the thermal means for operating the contacts which comprises the bimetallic element 30 is housed within the envelope of the vacuum switch 20. It is, of course, desirable that the tripping or operating temperature of the thermal means may be adjusted and this is accomplished in accordance with my invention by means of an adjusting screw 43 threadedly mounted in a member 44 supported within casing 17. Casing 17 is furthermore provided with spaced guides 45 and 46 defining a space therebetween within which L-shaped clamping plates 47 and 48 are slidable. L-shaped clamping plates 47 and 48 are provided with cooperating openings through which the end of switch arm 29 comprising tubular member 31, may extend. A suitable spring 49 surrounding adjusting screw 43 is placed under compression between L-shaped clamping plate 48 and member 44. As is clearly obvious from Fig. 3, the clamping plates 47 and 48 are free to move up and down between guides 45 and 46 under the pressure of screw 43. However, spring 49 in cooperation with adjusting screw 43, urges clamping plates 46 and 47 respectively in opposite directions so that tubular member 31 is clamped firmly at the point where it passes through the cooperating openings in clamping plates 47 and 48. With this arrangement, it is obvious that assembly of the adjusting means with the remainder of circuit interrupter 12 is a very simple operation and by virtue of spring 49 only a single adjusting screw 43 is required for either increasing or decreasing the tripping temperature of protective device 12.

In order to insure satisfactory opening and closing of the circuit at relatively movable contacts 21 and 22, it is desirable that means be provided to cause these contacts to operate with a snap action both in opening and in closing. Permanent magnet 27 adequately provides this feature since the coercive force of magnet 27 holds contact 22 in engagement with contact 21 until the force produced by the bimetal causes separation with a snap action. Again during a closing operation of the switch as the bimetallic element 30 causes contact 22 to move toward stationary contact 21, the coercive force of magnet 27 again becomes effective to close the contact with a snap action. In certain cases it may be possible to dispense with permanent magnet 27 and provide snap action by constructing extension 28 in the form of a permanent magnet preferably of the "alnico" type such as is disclosed and claimed in United States Letters Patents to Mishima, 2,027,994 to 2,028,000 inclusive, assigned to the same assignee as the present application. When extension 8 is made of such permanent magnet material it functions in the same manner as permanent magnet 27 which may then be dispensed with. By employing permanent magnet 27, however, the snap action may be varied by varying the size of permanent magnet 27.

Fixed contact 21 has been given a large radius and made in the form of a convex disk of large diameter for two reasons. First, it serves as a voltage distribution shield in addition to a contact and with this arrangement fairly high currents at 7500 volts are readily interrupted with a very small movement of switch arm 29, this movement at the contacts being of the order of a very small fraction of an inch. The second reason for constructing the contact 21 in the manner described is to prevent sticking of the contacts. The movement of bimetallic element 30 in response to heating thereof causes movable contact 22 to rock slightly with respect to stationary contact 21 thereby tending to pry apart the surfaces at the point where sticking occurs. The extension 28 provides leverage for this action.

It should be noted that in view of my invention, which includes positioning the thermal means within the vacuum switch housing, the thermal means is ideally suited for operation in protecting the transformer both against short circuit currents and long time overloads. Short circuit currents will of course flow through bimetallic element 30 and cause opening of contacts 21 and 22. For long time overload currents the evacuated envelope 19 inherently acts as a thermal lagging sleeve and no such separate sleeve is required. Evacuated envelope 19 therefore prevents the insulating liquid dielectric from cooling the bimetal too rapidly under short circuit conditions.

In view of the detailed description included above the operation of the protective device and interrupting means of my invention will be obvious to those skilled in the art. Under short circuit or fault conditions the current flowing through bimetal 30 causes it to flex and open contacts 21 and 22. The envelope 19 inherently prevents too rapid cooling of element 30 under these conditions. Permanent magnet 27, or in the event that member 28 is a permanent magnet, provides the necessary snap action effect of the contacts. Opening of the contacts interrupts the circuit through the primary winding of the transformer whereupon bimetallic element 30 cools and contacts 21 and 22 reclose since they are inherently biased to the closed position by the construction and adjustment of protective device 12. If the short circuit condition persists the circuit interrupting means will continue to cycle with the time the switch remains open gradually lengthening as the liquid dielectric surrounding envelope 19 warms up. This should be beneficial in minimizing the number of cycles which the switch will have to interrupt during a long period in which a short circuit persists on the secondary circuit of the transformer. It will be obvious that if a short circuit continues the average current flowing in the transformer will just supply the losses in heat from bimetallic element 30. Obviously the vacuum within the envelope 19 reduces these losses thereby reducing the average current flowing in the transformer during the period when interrupting means 12 is repeatedly opening and closing the short circuit current. This allows the transformer winding temperature to be kept down to a safe value and also reduces the number of openings and closings of the switch under prolonged short circuit conditions, which is desirable.

In the event of a long time overload the temperature of the liquid dielectric in transformer casing 2 gradually increases so as eventually to cause flexing of bimetal 30 and relative separation of contacts 21 and 22. It is desirable to have a fairly quick initial reclosing of the circuit under such conditions and therefore the tripping temperature of the circuit interrupting means 12 must be set at a relatively high value thereby providing a greater differential between the tripping temperature and the oil temperature, which is the ambient temperature of the interrupting means 12. Also the relatively small overload current which flows through the bimetal prior to tripping open must be able to cause a temperature rise in the bimetal equal to this difference between oil temperature and trip temperature, in order to cause tripping. The thermal insulation offered to the bimetal by virtue of the evacuated space around it allows these two conditions to be met successfully.

It will be obvious that by employing the vacuum envelope 19 no contamination of the liquid dielectric can occur upon interrupting the circuit of the transformer, and oxidation of the contacts is also completely eliminated. By providing the interrupting means 12 in the primary circuit a very small device is required which can readily be applied to many transformer designs without the slightest change in size of the transformer casing. Furthermore, with such an arrangement a very small mechanical force is required to operate the switch or circuit interrupter. The calibration of the thermal means described above is very simple and better control of the time current characteristic can be obtained.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. A protective switching device for use in high voltage electrical apparatus where the protective function must occur either upon attainment of excessive temperature of the apparatus or upon excessive current loading of the apparatus, said device comprising an evacuated envelope having conductive terminals for connecting the device in a circuit transmitting current representative of the loading of the apparatus, provisions associated with the envelope for mounting the envelope in heat-exchanging relation with a component of the apparatus, relatively movable contacts within the envelope respectively connected with said terminals, said contacts being co-operatively formed to assure low voltage gradients at the surfaces of the contacts upon separation of the contacts, a thermally deflectable member within the envelope supporting one of the contacts, and effective in deflected position to separate the contacts, said member being constituted of a metal which can be heated to the deflection point either by the passage of excessive current through it or by receipt of external heat corresponding to objectionable overheating of the apparatus component with which the envelope is to be associated, and means for assuring that both opening and closing of said contacts shall occur with a snap action.

2. A protective switching device for use in high voltage electrical apparatus where the protective function must occur either upon attainment of excessive temperature of the apparatus or upon excessive current loading of the apparatus, said device comprising an evacuated envelope having conductive terminals for connecting the device in a circuit transmitting current representative of the loading of the apparatus, provisions for mounting the envelope in heat-exchanging relation with a component of the apparatus, a stationary contact and a movable contact within the envelope respectively connected with said terminals, said contacts respectively comprising a planar member and a convex member having its convex surface presented to said planar member, whereby excessive potential gradients at the surfaces of said members are avoided upon separation of the contacts, and said movable contact including a body of magnetic material, a thermally deflectable member within the envelope supporting the movable contact and effective in deflected position to separate the contacts, said last named member being constituted of a metal which can be heated to the deflection point either by the passage of excessive current through it or by receipt of external heat corresponding to objectionable overheating of the apparatus component with which the envelope is to be associated, and a magnet external to the envelope but in sufficient proximity to the movable contact to cause opening and closing of said contacts to occur with a snap action.

SIDNEY R. SMITH, JR.

REFERENCES CITED

The following references are of record in the file of this patent:

UNITED STATES PATENTS

| Number    | Name       | Date          |
|-----------|------------|---------------|
| 1,798,854 | Satchwell  | Mar. 31, 1931 |
| 1,851,657 | Appelberg  | Mar. 29, 1932 |
| 1,950,240 | Hilgenberg | Mar. 6, 1934  |
| 2,223,726 | Hodnette   | Dec. 3, 1940  |